UNITED STATES PATENT OFFICE.

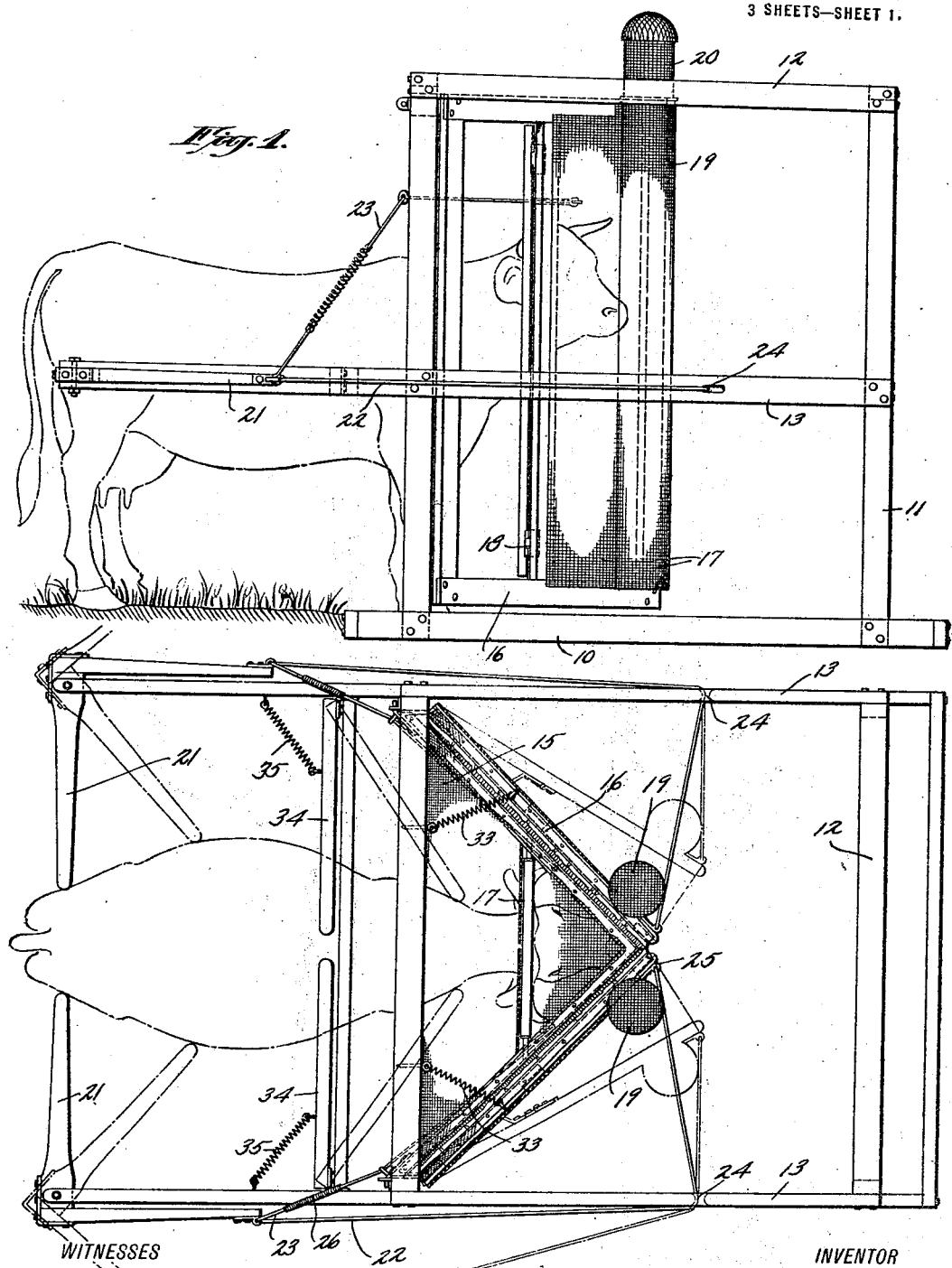

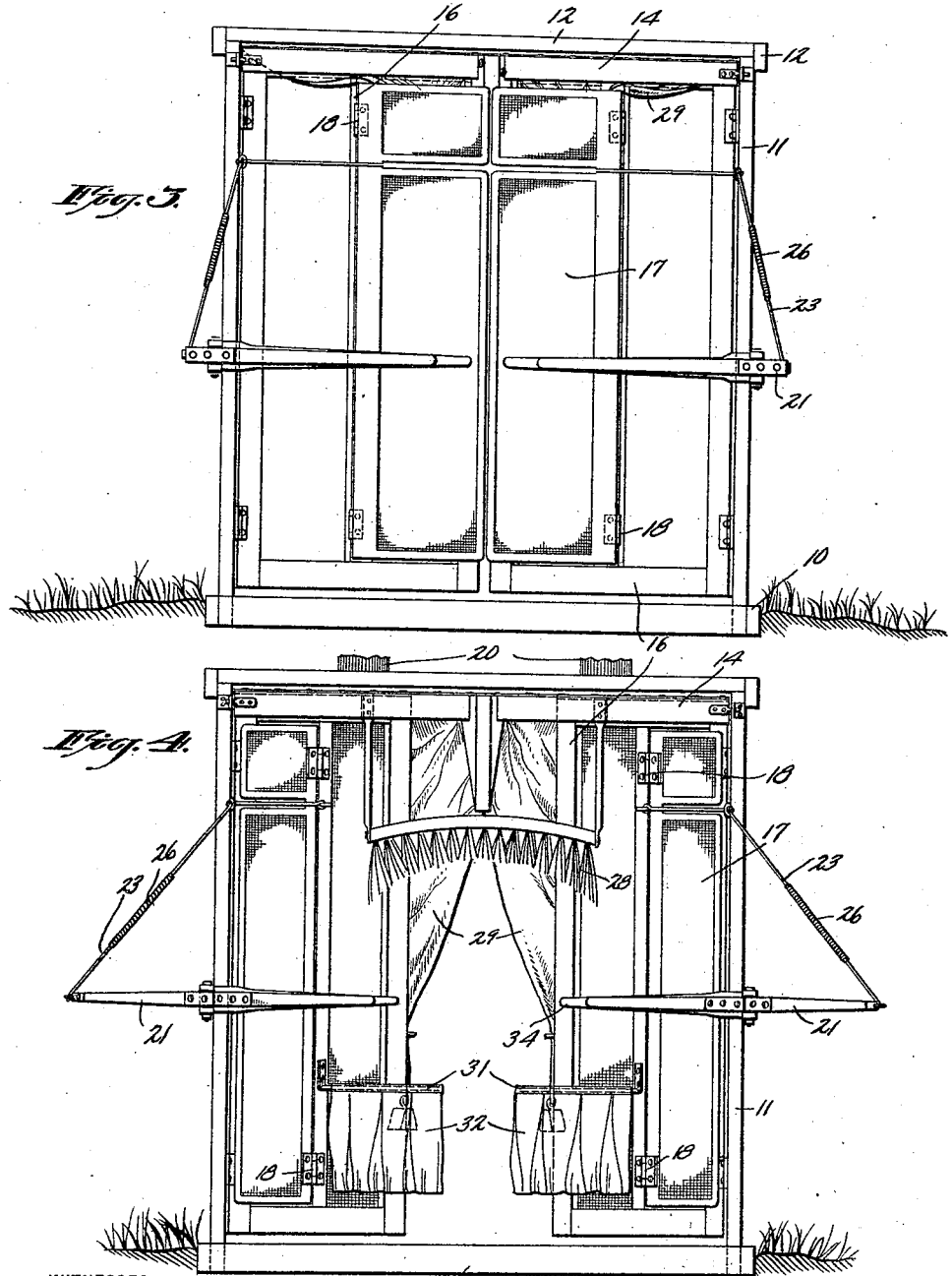

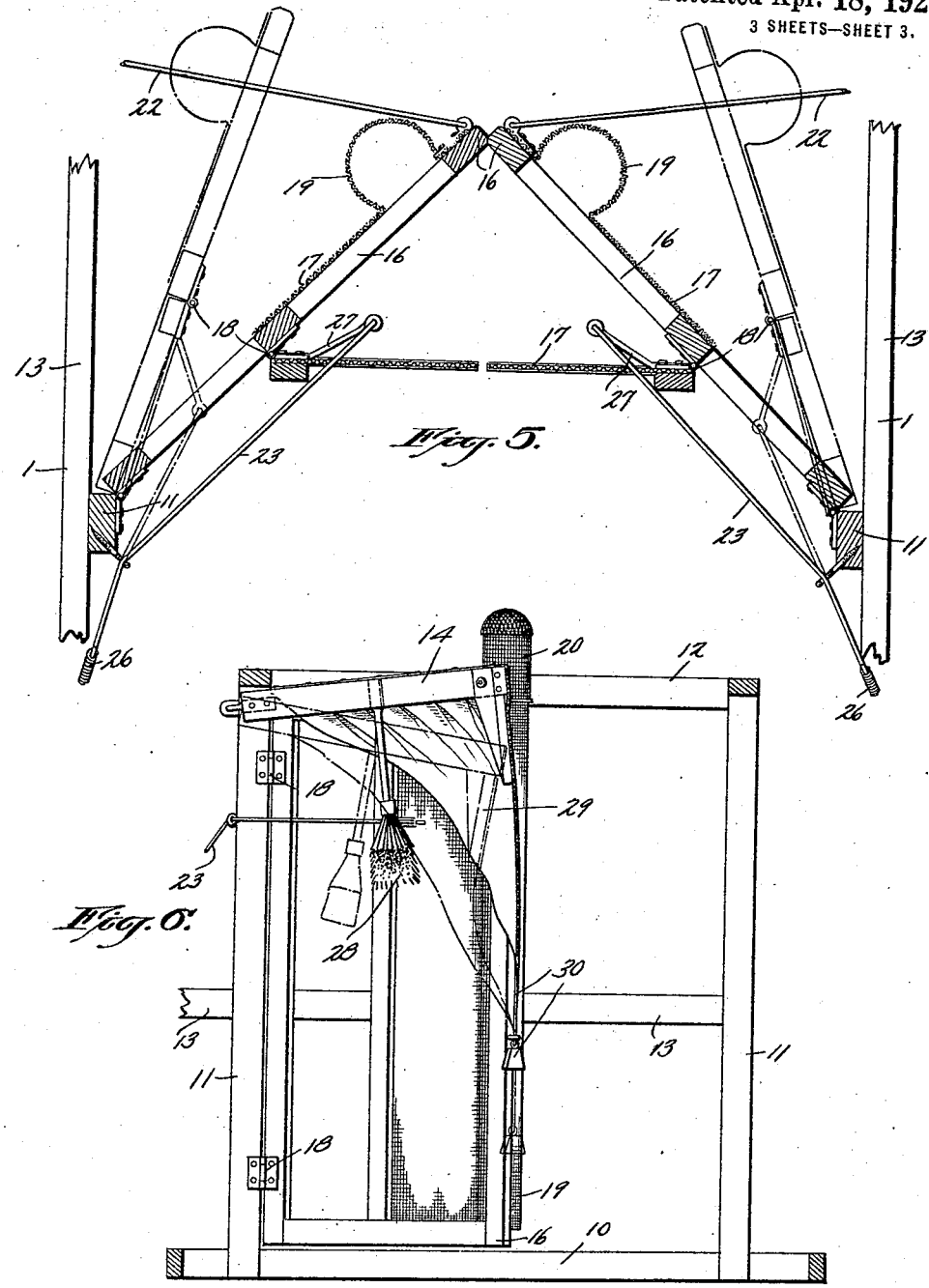

CHARLES H. JOHNSON, OF COLONY, KANSAS.

ANIMAL TRAP.

1,413,536.  Specification of Letters Patent.  Patented Apr. 18, 1922.

Application filed May 5, 1920. Serial No. 379,100.

*To all whom it may concern:*

Be it known that I, CHARLES H. JOHNSON, a citizen of the United States, and a resident of Colony, in the county of Anderson and State of Kansas, have invented a new and Improved Animal Trap, of which the following is a full, clear, and exact description.

It is well appreciated that cattle, in an endeavor to rid themselves of flies and other insects will run through brush, which will strike against their sides and thus cause the insects to leave the body of the animal. Cattle will often run amuck due to the tortures which they undergo caused by insects, and the exertion which they are subject to causes them to lose flesh, cease giving milk and results in a general depreciation of the value of the cattle.

With this in mind, I have constructed a trap particularly applicable for use in connection with cattle and by means of which the cattle may be rid of insects adhering to their sides upon passing through such trap, the insects being entrapped and subsequently killed.

My invention not only contemplates a trap of this nature which shall be able to remove adhering insects from the back of cattle, but will also cause flies to be removed from their legs, under-body and flanks.

Reference is had to the attached sheets of drawings illustrating one practical embodiment of my invention, and in which drawings;

Figure 1 is a side view of a trap constructed in accordance with my invention.

Figure 2 is a plan view thereof.

Figures 3 and 4 show the same in closed and open position respectively.

Figure 5 is a sectional plan view thereof, and

Figure 6 is a sectional side view of said trap.

In the drawings, like reference numerals designate similar parts, and the reference numeral 10 indicates sills which serve as a foundation for the trap, and with which are associated up-rights 11 connected together by means of cross pieces such as 12 whereby to provide a sufficiently square frame work. Intermediate supporting brace rods 13 extend between the up-rights 11, and along the sides of the trap, one end of these latter rods projecting to a point well in advance of the forward up-rights 11. The yoke 14 has its outer ends movably secured to the frame of the trap, at a point below the forward cross piece 12, and screening such as 15 extends between these cross pieces and the yoke to form, as has been clearly shown in Figure 2 a triangular shaped portion.

Doors 16 have their outer ends swingingly secured to the frame work and preferably to the up-rights 11 of the same, such doors being of such dimension that in closed position they extend at an angle to one another, as has been shown in Figures 2 and 5, their upper edges conveniently aligning with the yoke 14.

Each of the doors 16 preferably includes two panels arranged opposite one another, each of which panels is provided with screening 17, the panels adjacent the point of hinged connection of the doors 16 with the frame work of the trap being conveniently hinged as has been indicated by the reference numeral 18 to the main portion or second panel of the door, and being normally held in position as shown in Figure 5 by any suitable means such as springs 26 extending between the main portion of the doors 16 and the hinged panels.

In this connection it will be appreciated that by virtue of the screening 17 associated with both the immovable and swinging panels of the doors 16 and screening 15 associated with the yoke 14 that an enclosed space in the form of a triangle is provided which is shown in Figures 2 and 5 so that any insects entrapped within this space will move into the longitudinally extending troughs 19 associated with the immovable panels, which troughs terminate adjacent the upper ends in any conventional form of insect trap 20 so that flies and other insects crawling up the trough portions 19 of the screening 17 will be entrapped within the trap 20, which may conveniently be removed from the animal trap and the insects therein destroyed.

Now with a view of providing means which may be automatically actuated by the animal passing into my improved form of trap I hingedly associate with the forward ends of the supporting brace rods 13, bell crank levers 21. Attached to the outer ends of these bell crank levers are the ends of cables 22 and 23 respectively, the former passing through openings such as 24 in the rods 13 and having their ends attached to the doors 16 adjacent the forward edges of the same, as has been indicated by the reference numeral 25, the second cable 23 being conveniently provided with an interposed resilient member 26 and having its end attached to a crank such as 27 associated with the swinging panel of the door 16.

The yoke 14 conveniently carries a brush of any suitable construction, and the yoke is further conveniently draped with a cloth 29 which extends downwardly and outwardly as has been shown in Figures 4 and 6, a weight or any other suitable means 30 cooperating with the yoke 14 and serving to normally hold the same in this position as has been shown in Figure 6. Each of the doors 16 also conveniently mounts outwardly extending arms 31 carrying a cloth 32 which cloth engages the legs of the cattle upon passing through the trap, and serves to brush adhering insects therefrom.

In operation it is now to be appreciated that the trap normally presents the appearance shown in Figures 3, 5 and 6, and it will be understood that the animal will pass inwardly between the inner ends of the bell cranks 21 thus moving the same to the position indicated in dotted lines in Figure 2, in which position they will exert a pull upon the cables 22 and 23 resulting in the swinging panels of the doors moving to the position shown in Figure 4, and dotted lines in Figure 5, the doors swinging open simultaneously against the action of the springs 33, to the position also indicated in dotted lines in Figure 5. The animal will now continue in its movement, and will engage the levers 34 normally held in the position shown in full lines in Figure 2, by virtue of the springs 35, and upon these levers moving to a position slightly beyond that shown in Figure 2 the same will bear against the inner faces of the movable panels of the doors whereby to retain the doors in open position despite the fact that the rear end of the animal has passed beyond the ends of the bell crank levers 21. The brush 28 will now move over the back of the animal and scrape any adhering insects therefrom, the cloth 32 brushing against the legs and under-body of the animal serving the same purpose for these parts of the body.

The draped cloth 29 will brush against the head and neck of the animal and it will thus be seen that any insects adhering to practically any portion of the body of the same will be caused to fly or be removed therefrom, and the animal passing beyond the levers 34 will permit these levers to return to their normal position so that the movable panels of the doors 16 will snap back into position immediately after the passage of the same, and almost immediately after this has occurred the doors 16 themselves will move to their closed position by virtue of the fact that the animal has passed beyond them.

Thus any adhering insects will be entrapped within the enclosed space formed by the yoke 14 and the movable and immovable panels of the doors 16, and it will be obvious that these insects in their natural endeavor to escape from within this confined space will crawl or fly into the trough 19, and thus into the trap 20.

Obviously numerous modifications of structure might be resorted to without in the least departing from the scope of my claims.

Having thus described my invention what I claim as new and desire to secure by Letters Patent is as follows:—

1. A trap, including a frame-work, doors swingingly attached to said frame-work, said doors each including a stationary panel and swinging panel attached to said stationary panel, means for normally holding said swinging panel at an angle with respect to said stationary panel whereby to form an enclosed space, and means for swinging said doors and panels to permit of the passage of a body therebetween.

2. A trap, including a frame-work, supporting rods extending from such frame-work, bell crank levers associated with the outer ends of said supporting rods, levers movably secured to said supporting rods, and to the rear of said bell crank levers, doors swingingly secured to said frame-work, means for normally holding said doors in closed position, each of said doors including stationary and swinging panels, means for normally holding said swinging panels at an angle to said stationary panels, and means extending between the outer ends of said bell crank levers, doors and panels for swinging said doors to their open position, and aligning the movable panel with the stationary panel of the same.

CHARLES H. JOHNSON.